`US012270964B2`

United States Patent
Jachmann et al.

(10) Patent No.: US 12,270,964 B2
(45) Date of Patent: Apr. 8, 2025

(54) ADAPTIVE T1/T2 RATIO SELECTION FOR OPTIMAL COMPRESSION

(71) Applicant: Halliburton Energy Services, Inc., Houston, TX (US)

(72) Inventors: Rebecca Jachmann, Houston, TX (US); Jie Yang, Houston, TX (US); Pierre Aerens, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 18/234,117

(22) Filed: Aug. 15, 2023

(65) Prior Publication Data

US 2025/0060507 A1     Feb. 20, 2025

(51) Int. Cl.
*G01V 3/38* (2006.01)
*G01V 3/32* (2006.01)

(52) U.S. Cl.
CPC . *G01V 3/38* (2013.01); *G01V 3/32* (2013.01)

(58) Field of Classification Search
CPC .................................. G01V 3/32; G01V 3/38
See application file for complete search history.

(56) References Cited

U.S. PATENT DOCUMENTS

| 7,196,516 B2 | 3/2007 | Blanz et al. |
| 10,168,444 B2 | 1/2019 | Jachmann et al. |
| 10,209,391 B2 * | 2/2019 | Arro ........................ G01V 3/32 |
| 11,435,496 B2 | 9/2022 | Jachmann et al. |
| 11,536,870 B2 | 12/2022 | Yang et al. |
| 2004/0189296 A1 | 9/2004 | Sun et al. |
| 2005/0088176 A1 | 4/2005 | Kruspe et al. |
| 2008/0183390 A1 | 7/2008 | Hamdan et al. |
| 2013/0214779 A1 | 8/2013 | Tietjen et al. |
| 2016/0202384 A1 | 7/2016 | Utsuzawa et al. |
| 2017/0114634 A1 | 4/2017 | Yu et al. |
| 2021/0157026 A1 | 5/2021 | Yang et al. |
| 2021/0364668 A1 * | 11/2021 | Shao .................. G01R 33/5608 |

FOREIGN PATENT DOCUMENTS

WO     2021101555 A1     5/2021

OTHER PUBLICATIONS

International Search Report & Written Opinion; PCT Application No. PCT/US2023/030332; mailed May 3, 2024.
Abstract of Jachmann, Rebecca et al., "New Data Processing with new Generation Magnetic Resonance While Drilling Tool", Paper presented at the SPWLA 54th Annual Logging Symposium, New Orleans, Louisiana, Jun. 2013; Paper No. SPWLA-2013-UU.

* cited by examiner

*Primary Examiner* — Gregory H Curran
(74) *Attorney, Agent, or Firm* — NOVAK DRUCE CARROLL LLP (57)     ABSTRACT

Systems and methods for compressing nuclear magnetic resonance (NMR) data are disclosed. The methods include the steps of selecting a T1/T2 ratio value, inverting a first portion of the echo train data using the selected T1/T2 value, and reconstructing the inverted echo train using the selected T1/T2 value. A quality measure is calculated based on a comparison of the reconstructed echo train to the original echo train. When the quality measure is satisfactory, the NMR data is inverted using the selected T1/T2 value and transmitted to the surface.

18 Claims, 6 Drawing Sheets

ADAPTIVE T1/T2 RATIO SELECTION FOR OPTIMAL COMPRESSION

The present technology pertains to transmitting nuclear magnetic resonance (NMR) data from a wellbore.

BACKGROUND

During hydrocarbon exploration and production, NMR may be utilized to acquire data from a downhole environment. NMR logging measures nuclear spin angular momentum of nuclei (protons) contained within fluid-filled pore space of porous media such as reservoir rocks. Unlike conventional logging measurements (e.g., acoustic, density, neutron, and resistivity), which are dependent on mineralogy and respond to a rock matrix and fluid properties, NMR-logging measurements respond to the presence of fluids, e.g., water and hydrocarbons. NMR logs provide information about the quantities of fluids present, the properties of these fluids, and sizes of the pores containing these fluids.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to better illustrate details and features. The description is not to be considered as limiting the scope of the embodiments described herein.

The main functionality of logging tools is to take informative measurements that can be interpreted to use for optimal oil and gas production from underground. A NMR tool has the ability to distinguish different pore sizes and fluid content and can be incorporated into the drill string so that measurements can be made while the wellbore is being drilled. Measurements while drilling are considered beneficial since drilling mud has not had time to invade the formation. The rate at which NMR data is sent to the surface with telemetry, however, is limited in a drilling environment. The current telemetry rate is very slow, typically on the order of 10 bits-per-second (bps) depending on depth, for all the tools on the entire drill string. An NMR tool may be allotted a small portion of the pulsing rate, especially when image data also needs to be sent up from imaging tools. As a result, the bandwidth allocated to an NMR data could be down to about 9 bits per minute.

The disclosed technology addresses the foregoing by compressing the NMR data before being transmitted to the surface. The sent NMR data includes T1 and T2 data inverted using a single T1/T2 ratio, compressed, and then transmitted to the surface where the echoes are reconstructed using the same T1/T2 ratio if the reconstruction is for time not equal to zero. Lastly, the reconstructed echo data is inverted again to obtain a final spectrum. A reconstructed echo is any echo which was calculated and not directly measured via an echo waveform integration. Examples of reconstructed echoes are calculated echoes from compressed data or from a spectrum. Compression of the data may include a step of delta compression of echo reconstruction, or accumulation of the spectrum. The accuracy of the surface echo reconstruction, however, depends on selecting an optimal T1/T2 ratio value for the particular data set downhole. As described herein, an iterative process is used wherein a candidate T1/T2 ratio value is used to invert and then reconstruct the data in the NMR tool, which can be assessed for acceptability. The reconstructed data is compared to the original data and assigned a quality metric. A new T1/T2 ratio value is then selected based in part on at least one of the prior values and the quality metric. This cycle is repeated until an optimal value is found, sometimes determined by a threshold value, other times calculated directly. Finally, this optimal T1/T2 ratio value is used to invert and reconstruct the data, followed by reconstruction. The compressed data is transmitted to the surface. The final T1/T2 ratio value is either included in the transmission or derived from the data set if the reconstructed data still contains echoes other than A0, where A0 is the reconstructed echo for time equal to zero.

Figure 1:
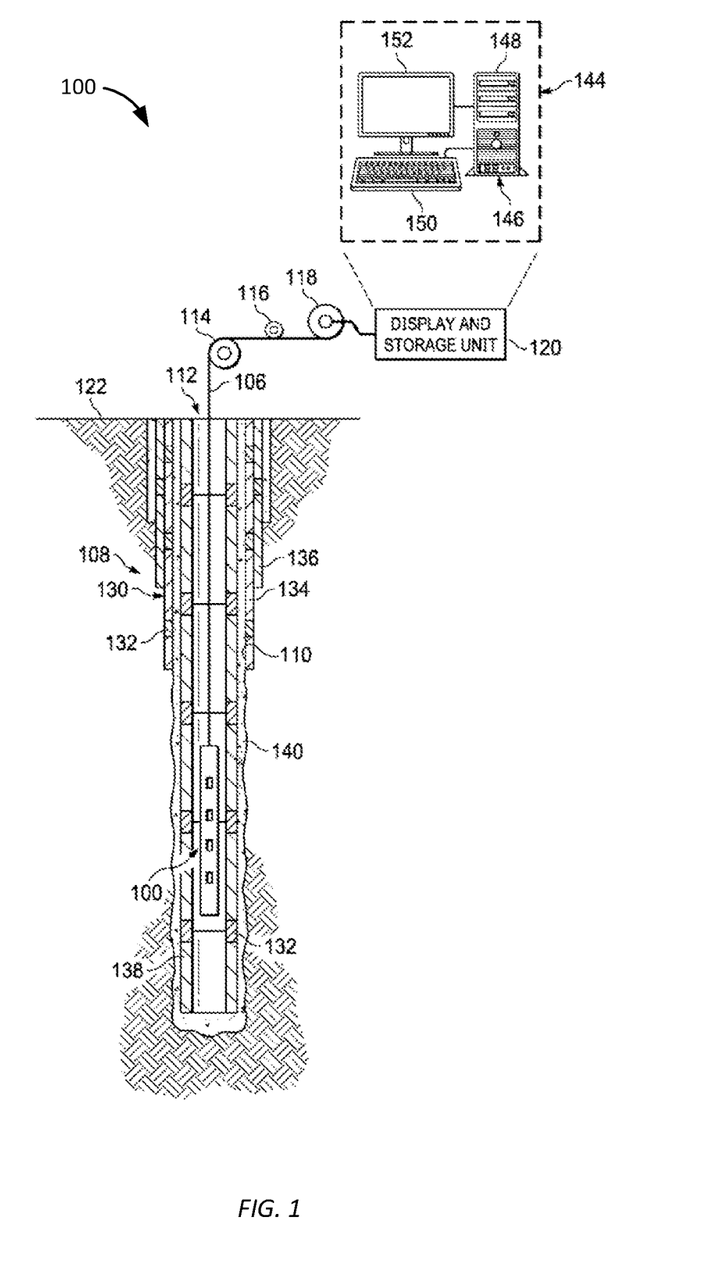
FIG. 1 illustrates an NMR tool in a wireline configuration, in accordance with various aspects of the subject technology.

FIG. 1 illustrates an NMR tool in a wireline configuration 100, in accordance with various aspects of the subject technology. It should be noted that while FIG. 1 generally depicts a land-based operation, those skilled in the art will recognize that the principles described herein are equally applicable to subsea operations that employ floating or sea-based platforms and rigs without departing from the scope of the disclosure.

In this example, the NMR tool 100 is operatively coupled to a conveyance 106 (e.g., wireline, slickline, coiled tubing, pipe, downhole tractor, and/or the like) which may provide mechanical suspension, as well as electrical connectivity, for the NMR tool 100. It should be understood that the configuration of NMR tool 100 shown on FIG. 1 is merely illustrative and other configurations of the NMR tool 100 may be used with the present techniques.

The conveyance 106 and the NMR tool 100 extend within a casing string 108 to a desired depth within the wellbore 110. The conveyance 106 exits a wellhead 112, passes around a pulley 114, engages an odometer 116, and is reeled onto a winch 118 that raises and lowers the NMR tool 100 in the wellbore 110. In certain embodiments, signals recorded by the NMR tool 100 are stored on a local memory and then processed by a display and storage unit 120 after recovery of the NMR tool 100 from the well bore 110. In certain embodiments, signals recorded by the NMR tool 100 are transmitted to the display and storage unit 120 by way of the conveyance 106. The display and storage unit 120 process the signals, and the information contained therein is displayed for an operator to observe as well as stored for future processing and reference. In certain embodiments, the signals are processed downhole prior to receipt by display and storage unit 120. In certain embodiments, the display and storage unit 120 comprise an apparatus for supplying control signals and power to the NMR tool 100. The casing string 108 extends from the wellhead 112 at or above ground level to a selected depth within the wellbore 110. The casing string 108 comprises a plurality of joints 130 or segments of the casing string 108, each joint 130 being connected to the adjacent segments by a collar 132. In certain embodiments, there are multiple layers in the casing string 108, e.g., the casing comprises a first casing 134 and a second casing 136.

FIG. 1 also illustrates a pipe string 138 positioned inside of casing string 108 and extending down wellbore 110. In certain embodiments, the pipe string 138 is one of production tubing, a tubing string, a casing string, or other pipe disposed within casing string 108. In certain embodiments, pipe string 138 comprises concentric pipes connected by collars 132. In certain embodiments, the NMR tool 100 is dimensioned so that it may be lowered into the wellbore 110 through the pipe string 138, thus avoiding the difficulty and expense associated with pulling pipe string 138 out of wellbore 110. In examples, cement 140 may be disposed on the outside of pipe string 138. In certain embodiments, cement 140 is disposed between pipe string 138 and casing string 108.

In logging systems utilizing the NMR tool 100, a digital telemetry system may be employed, wherein an electrical circuit may be used to both supply power to the NMR tool 100 and to transfer data between the display and storage unit 120 and the NMR tool 100. A DC voltage may be provided to the NMR tool 100 by a power supply located above ground level, and data may be coupled to the DC power conductor by a baseband current pulse system. Alternatively, the NMR tool 100 may be powered by batteries located within the downhole tool assembly, and/or the data provided by the NMR tool 100 may be stored within the downhole tool assembly, rather than transmitted to the surface during logging.

In certain embodiments, operation and function of the NMR tool 100 is controlled from the surface 122 by an information handling system 144. In certain embodiments, the information handling system 144 is a component of the display and storage unit 120. In certain embodiments, the information handling system 144 is configured to compute, estimate, classify, process, transmit, receive, retrieve, originate, switch, store, display, manifest, detect, record, reproduce, handle, or utilize any form of information, intelligence, or data for business, scientific, control, or other purposes. In certain embodiments, the information handling system 144 is one of a personal computer, a network storage device, or any other suitable device and may vary in size, shape, performance, functionality, and price. The information handling system 144 includes a processing unit 146, e.g., a microprocessor or central processing unit, that processes NMR log data by executing instructions obtained from a local non-transitory computer readable media 148, e.g., a solid-state device (SSD) or a magnetic disk. In certain embodiments, the media 148 store instructions to perform the methods described herein. In certain embodiments, the media 148 includes any instrumentality or aggregation of instrumentalities that may retain data and/or instructions for a period of time, including a direct access storage device, e.g., a hard disk drive or floppy disk drive, a sequential access storage device, e.g., a tape disk drive, a compact disk, CD-ROM, DVD, RAM, ROM, an electrically erasable programmable read-only memory (EEPROM), and/or a flash memory; as well as communications media such wires, optical fibers, microwaves, radio waves, and other electromagnetic and/or optical carriers; and/or any combination of the foregoing. In certain embodiments, the information handling system 144 comprises an input device 150, e.g., a keyboard or a mouse, and output device 152, e.g., a monitor or a printer. The input device 150 and output device 152 provide a user interface that enables an operator to interact with the NMR tool 100 and/or software executed by processing unit 146. In certain embodiments, the information handling system 144 enables an operator to select analysis options, view collected log data, view analysis results, and/or perform other tasks. In certain embodiments, the NMR tool 100 and the information handling system 144 are utilized to measure properties, e.g., NMR properties, in a downhole environment.

Figure 2:
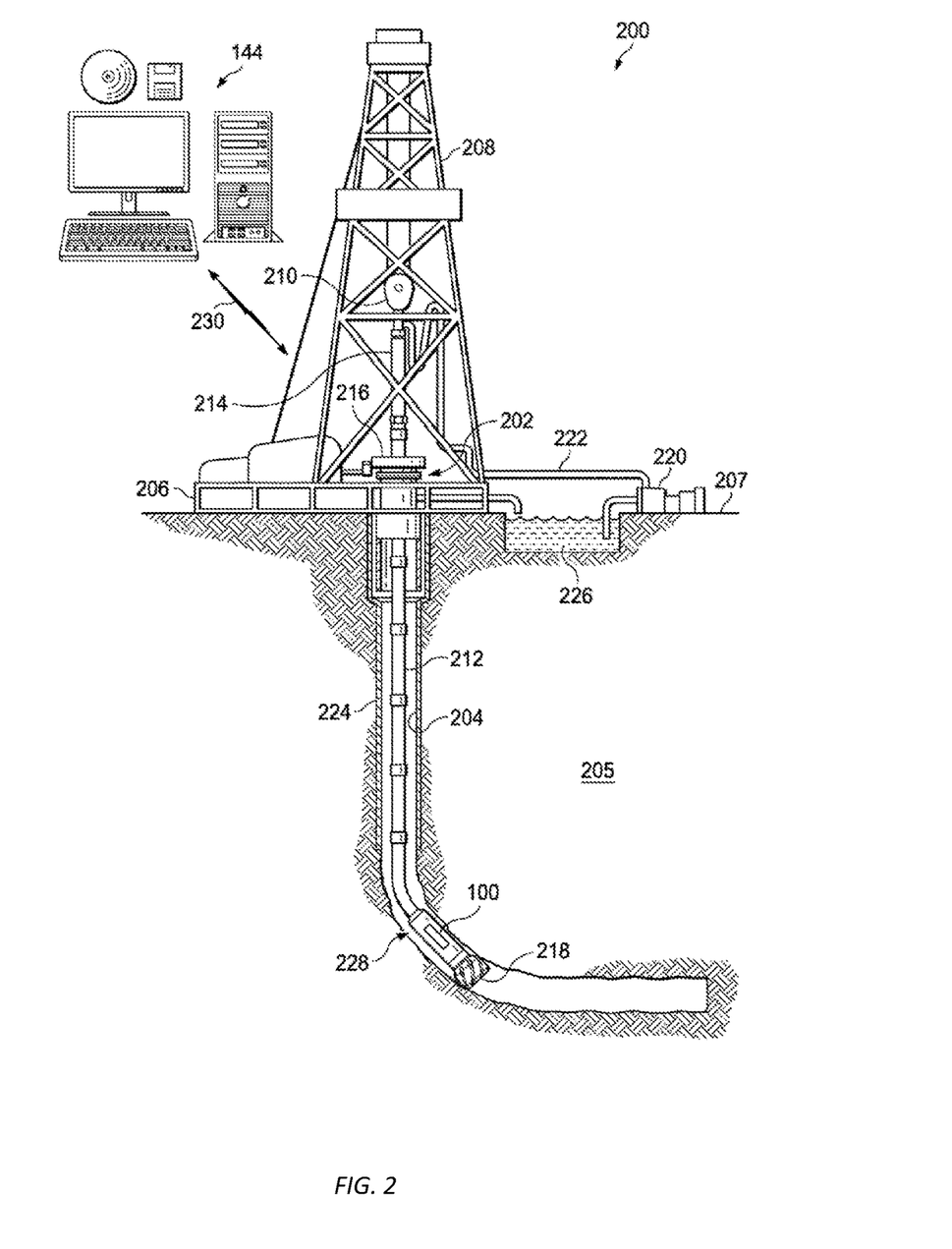
FIG. 2 illustrates an NMR tool in a drilling configuration, in accordance with various aspects of the subject technology.

FIG. 2 illustrates an NMR tool in a drilling configuration 200, in accordance with examples of the present disclosure. It should be noted that while FIG. 2 generally depicts a land-based operation, those skilled in the art may recognize that the principles described herein are equally applicable to subsea operations that employ floating or sea-based platforms and rigs, without departing from the scope of the disclosure.

A borehole 204 extends from a wellhead 202 into a subterranean formation 205 from a surface 207. In certain embodiments, the borehole 204 includes horizontal, vertical, slanted curved, and other types of borehole geometries and orientations. A drilling platform 206 support a derrick 208 having a traveling block 210 for raising and lowering a drill string 212. In certain embodiments, the drill string 212 includes, but is not limited to, drill pipe and coiled tubing, as generally known to those skilled in the art. A top drive or kelly 214 support the drill string 212 as it is lowered through a rotary table 216.

In certain embodiments, a drill bit 218 is attached to the distal end of drill string 212 and driven either by a downhole motor and/or via rotation of drill string 212 from the surface 207. Without limitation, the drill bit 218 comprises one or more of roller cone bits, PDC bits, natural diamond bits, hole openers, reamers, coring bits, and the like. As the drill bit 218 rotates, it creates and extends borehole 204 that penetrates the subterranean formation 205. In certain embodiments, a pump 220 circulates a drilling fluid through a feed pipe 222 to the kelly 214, downhole through the interior of the drill string 212, through orifices in the drill bit 218, back to the surface 207 via an annulus 224 surrounding the drill string 212, and into a retention pit 226.

In certain embodiments, the drill string 212 begins at wellhead 202 and traverses borehole 204. In certain embodiments, the drill bit 218 is part of a bottom hole assembly 228 at a distal end of the drill string 212. In certain embodiments, the bottom hole assembly 228 includes the NMR tool 100. As will be appreciated by those of ordinary skill in the art, bottom hole assembly 228 may be a measurement-while-drilling (MWD) or a logging-while-drilling (LWD) system.

In certain embodiments, the NMR tool 100 is connected to and/or controlled by the information handling system 144. In certain embodiments, processing of information occurs downhole and/or at the surface 207. In certain embodiments, data being processed downhole is transmitted to the surface 207 to be recorded, observed, and/or further analyzed. In certain embodiments, the data is stored in a memory of the NMR tool 100 while the NMR tool 100 is disposed downhole.

In certain embodiments, wireless communication is used to transmit information back and forth between the information handling system 144 and the NMR tool 100. In certain embodiments, the information handling system 144 transmits information to the NMR tool 100. In certain embodiments, the bottom hole assembly 228 includes one or more additional components, e.g., an analog-to-digital converter or filter or amplifier, that process the measurements of the NMR tool 100 before being transmitted to the surface 207. In certain embodiments, the raw measurements are transmitted to the surface 207 from the NMR tool 100.

Techniques used for transmitting signals from the NMR tool 100 to the surface 207 include, but not limited to, wired pipe telemetry, mud-pulse telemetry, acoustic telemetry, and electromagnetic telemetry. In certain embodiments, the bottom hole assembly 228 comprises a telemetry subassembly that transmits data to the surface 207. In certain embodiments, an electromagnetic source in the telemetry subassembly generates pressure pulses in the drilling fluid, e.g., "mud pulsing," that propagate along the fluid stream to the surface 207 where pressure transducers convert the pressure signal into electrical signals for a digitizer that provides a digital form of the telemetry signals to the information handling system 144 via a communication link 230, which may be a wired or wireless link.

Figure 3:
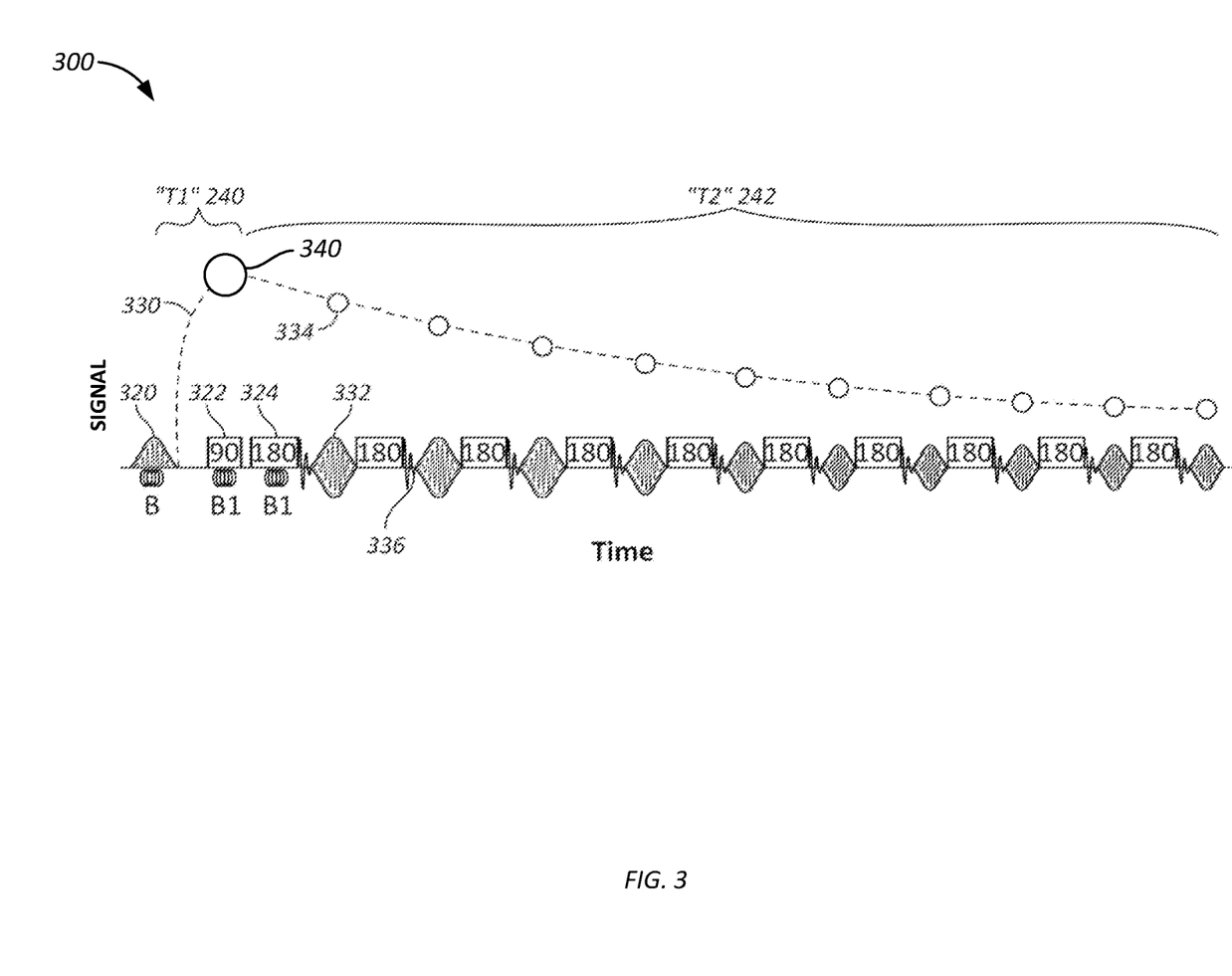
FIG. 3 is a plot of an example NMR echo train, in accordance with various aspects of the subject technology.

FIG. 3 is a plot 300 of an example NMR echo train 330, in accordance with various aspects of the subject technology. NMR logging tool 134, from FIG. 1, may obtain NMR signals by polarizing nuclear spins in the local formation and pulsing the nuclei with a radio frequency (RF) magnetic field. A first static magnetic field 320, commonly referred to as the "B0" field, is experienced in the surrounding. The NMR active nuclei will polarize over time towards the direction of the static magnetic field. The accumulation of a group of magnetic spins is called "the magnetization". The magnetization can be a "local magnetization" if a small section of spins are considered, or a "bulk magnetization" if all spins are considered at once. Three specific pulses, created by limited timed alternating current in the antenna, are then commonly used in NMR downhole measurements. The time-varying magnetic field is turned on and off at different increments to create a pulse. The first pulse is an amplitude and phase time-varying current intended to nullify the magnetization in a specific region of space within the static magnetic field, shown as 320 and 414. The second manipulation is commonly called an "excitation" pulse, shown in FIG. 3 as pulse 322. This pulse will ideally flip the magnetization by 90 degrees, and so it is often labeled as a "90 pulse." The third pulse, commonly referred to as a "recovery" or a "180" pulse and shown in FIG. 3 as pulse 324, applies a time-varying magnetic field by adjusting the pulse length and/or and amplitude, the magnetization may be rotated any amount. Various pulse sequences (e.g., series of radio frequency pulses, delays, and other operations) may be used to obtain the NMR signals, including the Carr Purcell Meiboom Gill (CPMG) sequence reflected in FIG. 3.

The received data comprises two characteristics of the magnetization: longitudinal recovery (T1) 240 and transverse relaxation (T2) 242. The T2 parameter is influenced by the formation 205 and gradient of the tool 100. One method to obtain the T2 curve is to refocus the magnetization with a sequence of 180 pulses 324 and measure the echo free induction decay (FID) 332 produced by each the spins refocusing after the refocusing pulse 324. The "ringing" response 336 generated by each 180 pulse is nullified by using a phase alternated pair (PAP). A PAP is two subsequent echo train where the phase of the excitation pulse is respectively differing from the first train to the second train in such a manner that the ringing remains the same while the NMR signal returns with opposing phase. The two trains can then be summed together to see the ringing effect or subtracted to eliminate the ringing. Each echo FID is integrated to give a single value 334 (called an echo), and a series of echoes 334 form a pulse train referred to as an echo train 330. An initial value 340 on the T1 curve is extrapolated or reconstructed from the series of data points 334 and is given the value A0.

The NMR results are not only useful after the drilling phase of the well construction is finished, which can be accomplished after the NMR tool is retrieved and the stored data downloaded, but also useful in real-time while drilling to make timely decisions. It is thus desirable to provide a portion of the data in real-time while drilling and confirm the data after the drilling is finished. Transmission speeds from the downhole NMR tool to an uphole computer, however, are too slow to transmit the raw echoes. A method of compressing or summarizing the NMR data is required.

The NMR data can be compressed by reconstructing select echo in the time domain after the data has been "inverted," i.e., after a mathematical "inversion" has been applied to move the data from the time domain to a different basis, which may be one of T1, T2, or D, i.e., diffusion. One method known to those of skill in the art, for example as described in U.S. Pat. No. 11,536,870, uses a single T1/T2 ratio to invert the data. The ability to accurately invert, and by extension accurately reconstruct the NMR data, however, is dependent upon a proper selection of the T1/T2 ratio used in the inversion. T1/T2 ratios have been found to vary from 1 all the way up to 10. The T1/T2 ratio can be dependent on pore size and fluid type and so may vary not only between wellbores but even within a wellbore. As a pore shrinks, the magnetic susceptibility of the walls increases the local gradient and the T2 of the NMR active substances near the wall drops off. The T1 value does not decrease at the same rate as the T2, as the T1 parameter quantifies the rate of energy transfer from the nuclear spin in the formation to their neighboring molecules via dipolar interactions, leading to a higher T1/T2 ratio. If an incorrect T1/T2 ratio is used in the inversion, the reconstructed values could be higher or lower than the real values.

In an embodiment of the method disclosed herein, an initial T1/T2 value is selected and used to invert the echo train in the downhole tool. The echo train is then reconstructed by the same tool, i.e., prior to transmission uphole, and the reconstructed echo train is compared to the original echo train. In certain embodiments, a quality measure is determined based on the comparison. In certain embodiments, the quality measure is a fitting error calculated from the differences between each reconstructed echo value and the corresponding original echo value using equation 1:

$$\sigma = \sqrt{\frac{\sum ((E_{i\_original} - E_{i\_reconstructed})^2)}{N - 1}}$$

where:
σ fitting error
$E_i$ the $i^{th}$ echo value
N the number of echo values In certain embodiments, the quality measure is compared to a threshold and the T1/T2 ratio used in the inversion is considered satisfactory if the quality measure is less than the threshold. Once a satisfactory T1/T2 value is identified, that T1/T2 value is used in a final process to invert the data that is to be sent to the surface. In certain embodiments, the final process comprises reconstruction of a portion of the echo trains that are then compressed and sent to the surface.

In certain embodiments, evaluation inversions are performed using a plurality of predetermined T1/T2 values and the T1/T2 value that produces the "best" quality measure is used in the final process.

If the quality measure exceeds the threshold, a new T1/T2 value is selected and the inversion and reconstruction are performed again. This iterative process repeats itself until a satisfactory T1/T2 value is found. In certain embodiments, the process has a limit on the number of iterative cycles. In such case, the T1/T2 value that produced the lowest quality measure of all the iterations within the limit of iterative cycles is used.

In certain embodiments, the value of the quality measure is used to select a new T1/T2 value. In certain embodiments, the new T1/T2 value is selected from a predetermined range. In certain embodiments, a third value determined by the spectrum, e.g., an average T1, root mean square, or log mean square of the spectrum, will aid in selecting a new T1/T2 ratio to test.

Figure 4:
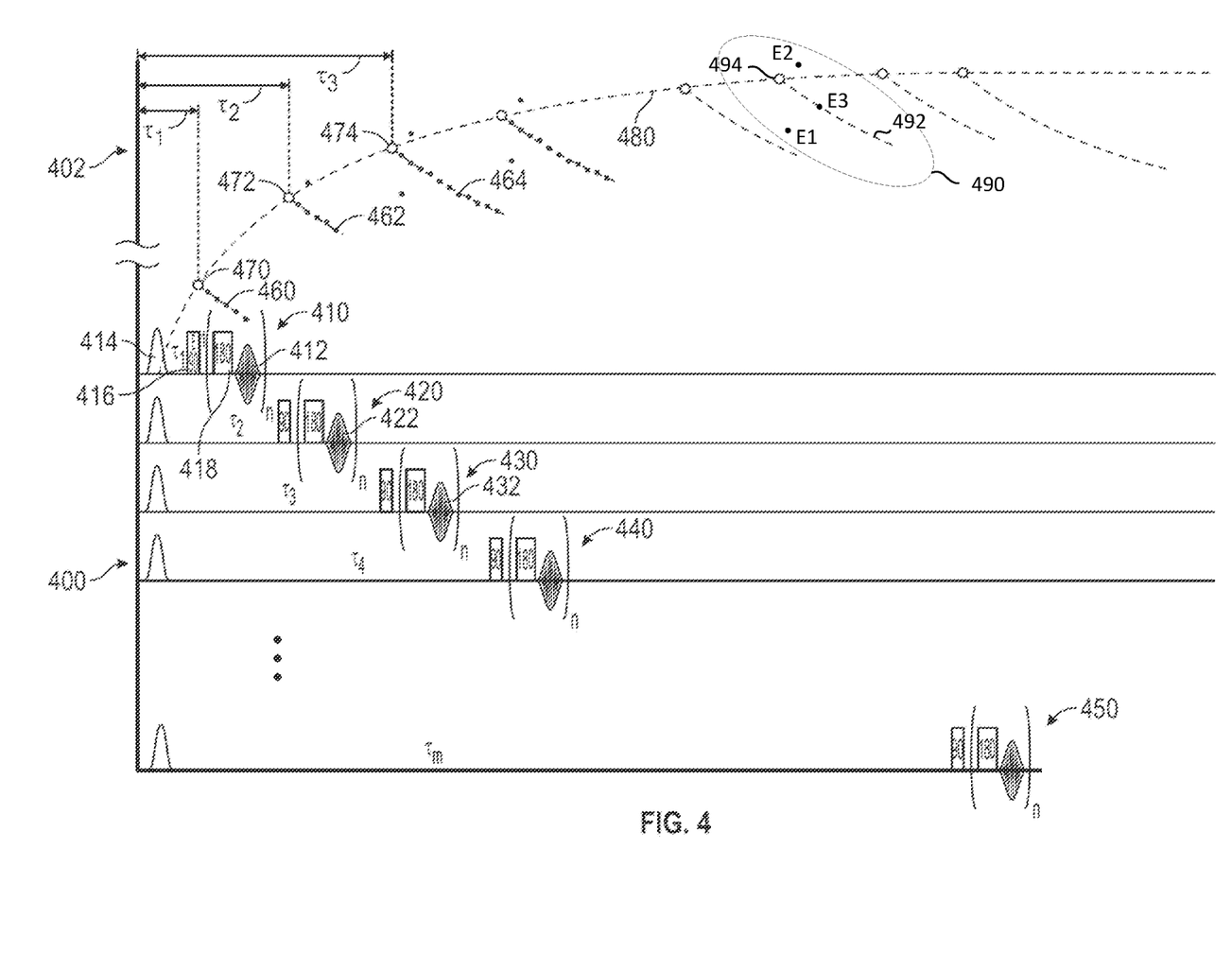
FIG. 4 illustrates an example method of data compression, in accordance with various aspects of the subject technology.

FIG. 4 illustrates an example method of data acquisition, in accordance with various aspects of the subject technology. The lower portion 400 of FIG. 4 depicts examples of sequential pulse trains 410, 420, 430, 440, and 450, rearranged to align the initial saturation RF pulses 414 of each pulse train. Each pulse train has an initial pulse 414 followed by a time delay, then a "90" pulse 416, and then a repeated series of sets of inversion pulses 418 followed by FIDs 412, 422, 432, etc. The time delays τ between the initial pulse 414 and the "90" pulse 416 are different for each echo train, shown as time delays $\tau_1$, $\tau_1$, $\tau_1$, etc., in portion 402. In certain embodiments, three or more pulse trains are generated with incrementally longer delay times. In certain embodiments, four or more pulse trains are generated. In certain embodiments, eight or more pulse trains are generated. In certain embodiments, two or more pulse trains are generated.

As discussed with respect to FIG. 3, each FID creates an echo value and each pulse train creates an echo train, e.g., the pulse train 410 with FIDs 412 creates the echo train 460 that is plotted in portion 402 of FIG. 4. Likewise, the pulse train 420 with FIDs 422 creates the echo train 462, the pulse train 430 with FIDs 432 creates the echo train 464, and so on. Each echo train is then extrapolated to determine its respective initial value, e.g., echo train 460 is extrapolated to determine its initial value 470. As shown in region 490, an echo train will have scattered data points E1, E2, E3, etc. from the repeated pulses 412 and a curve 492 is fitted to the points and extrapolated to identify the initial value point 494. Likewise, echo train 462 can be extrapolated to determine its initial value 472, echo train 464 can be extrapolated to determine its initial value 474, etc. Once a plurality of initial values 470, 372, 474, etc. are known, a T1 curve 480 can be fitted to the values.

Figure 5:
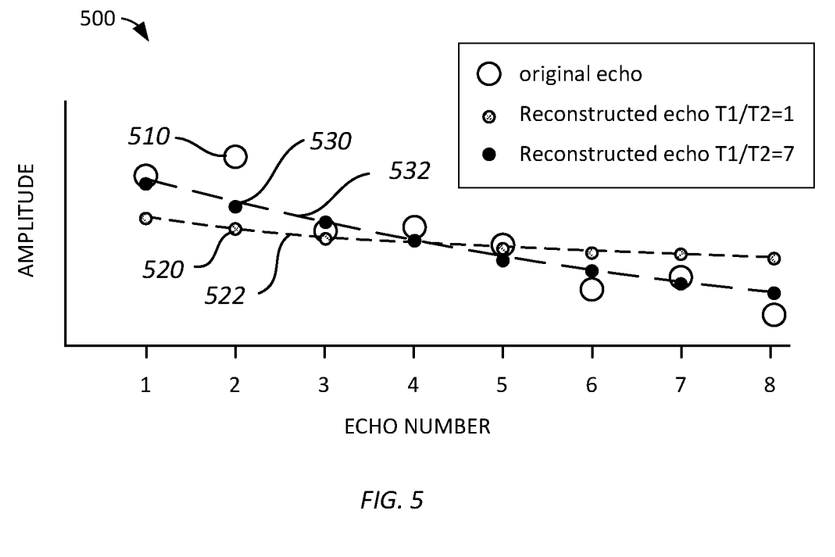
FIG. 5 illustrates the effect of various T1/T2 ratios in reconstructing an echo train, in accordance with various aspects of the subject technology.

FIG. 5 illustrates the effect of various T1/T2 ratios in reconstructing an echo train, in accordance with various aspects of the subject technology. Plot 500 depicts the values of the first eight echoes 510 of a single original echo train. This echo train was first inverted using a T1/T2 value=1 then reconstructed, which produces the reconstructed echoes 520 that are associated with a fitted curve 522. Although a ratio of approximately 1 is considered standard, curve 522 is not a good fit to the original echoes 510.

This same original echo train is then inverted using a T1/T2 value=7, and subsequently reconstructed. This process produces the reconstructed echoes 530 that are associated with curve 532, which is a noticeably better fit to the original echoes 510 than curve 522.

Figure 6:
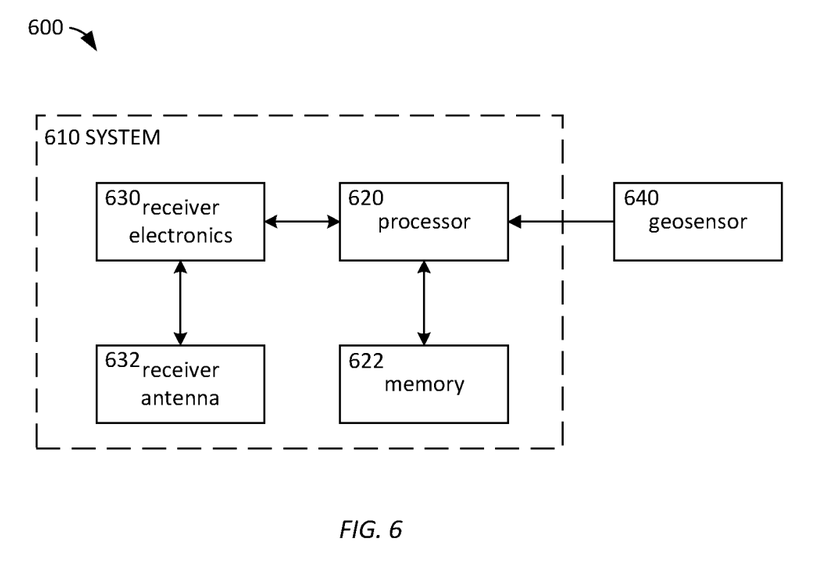
FIG. 6 is a block diagram of an example system, in accordance with various aspects of the subject technology.

FIG. 6 is a block diagram 600 of an example system 610, in accordance with various aspects of the subject technology. The system 610 comprises a processor 620 and a memory 622 communicatively coupled to the processor 620. The memory contains instructions that, when loaded into the processor and executed, cause the processor 620 to perform certain steps of a method disclosed herein. The processor 620 is also communicatively coupled to the receiver electronics 630 that are further coupled to the receiver antenna 632, e.g., a portion of a NMR sensor. The processor 620 is also coupled to an external geosensor 640 that is configured to provide one of a depth or orientation within the wellbore.

Figure 7:
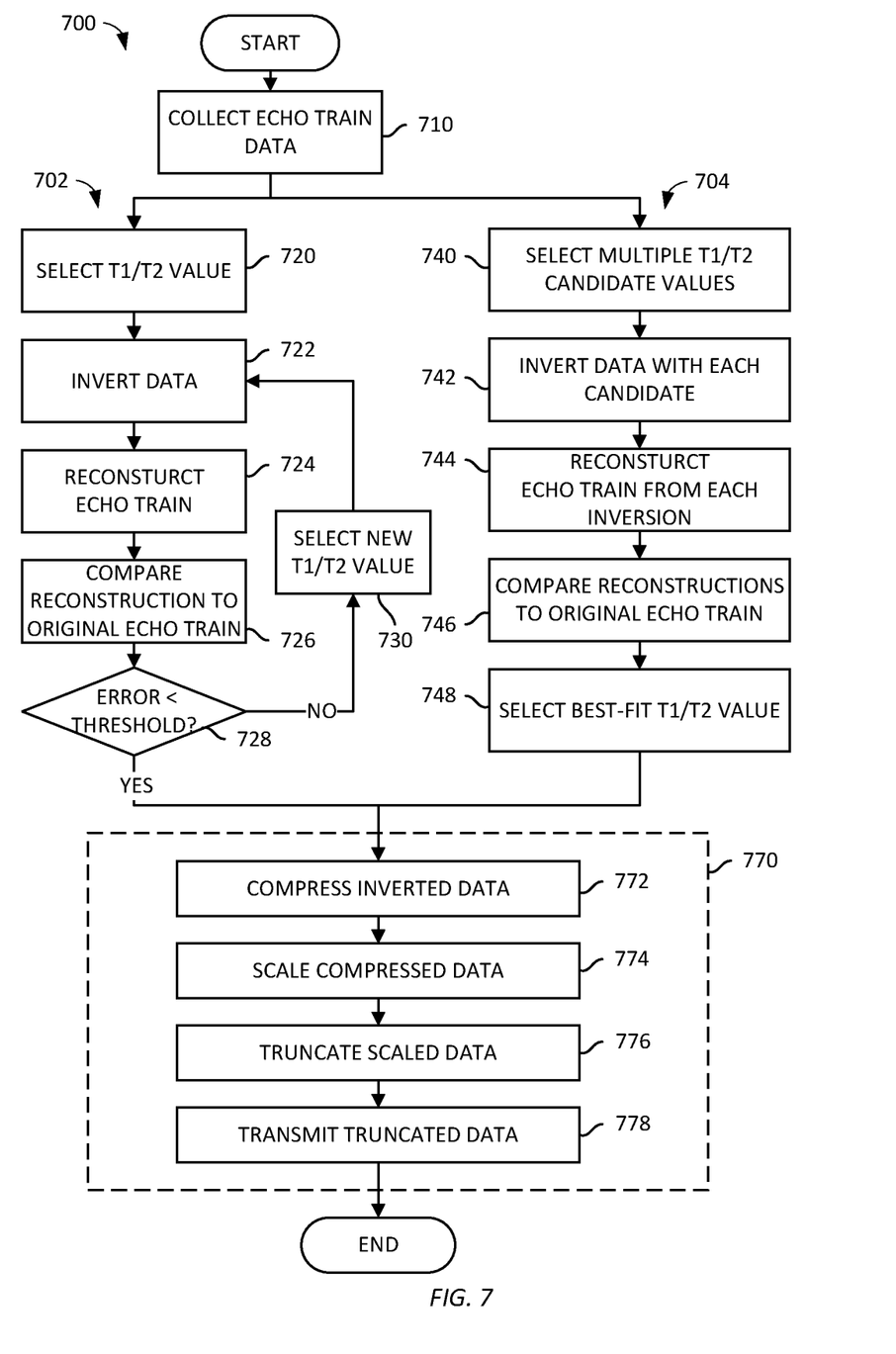
FIG. 7 is a flowchart of example methods of selecting a T1/T2 ratio, in accordance with various aspects of the subject technology.

FIG. 7 is a flowchart 700 of example methods of selecting a T1/T2 ratio, in accordance with various aspects of the subject technology. In step 710, NMR data is collected and used to generate an echo train as known to those of skill in the art. Paths 702 and 704 are alternate implementations of one of the methods disclosed herein. For the iterative path 702, a first T1/T2 value is selected in step 720. In certain embodiments, the first T1/T2 value is predetermined. In certain embodiments, the first T1/T2 value selected based in part on information about the formation around the wellbore, e.g., data from nearby wellbores in the same formation. Step 722 inverts all or a portion of the echo train generated from the measured data of step 720. Step 724 then reconstructs the echo train, i.e., the echo values of the inverted echo train. Step 726 compares the reconstructed echo train to the original echo train of step 720 and determines a quality measure, e.g., the fitting error previously disclosed, that is compared to a threshold in step 728. The process branches to step 772 if the quality measure is less than a threshold value, otherwise branches to step 30 and then return to step 722 to iteratively repeat steps 772-728.

In this example, a lower quality measure indicates a better fit of the reconstructed data to the original data. In certain embodiments, an alternate quality measure is used wherein a larger value indicates a better fit, in which case the comparison of step 728 is inverted. In general, the quality measure is compared to a threshold to determine whether the quality measure is "good enough." A decision is based on the comparison of the quality measure to a threshold, wherein a first choice is executed when the quality measure is determined to be good enough while an alternate choice is executed when the quality measure is not yet good enough.

In certain embodiments, step 722 inverts only a portion of the echo train, e.g., a predetermined number of echoes, and step 724 reconstructs those inverted echoes, and the comparison of steps 726-728 are based only on the portion of the original echo train that was inverted and reconstructed.

In certain embodiments of path 702, there is a predetermined limit on the number of iterations of steps 722-728 and step 728 includes a comparison of the number of iterations to this limit, branching to step 722 if the iteration limit is reached.

For the single-pass path 704, a plurality of candidate T1/T2 values is selected in step 740. Step 742 inverts a portion of the echo train of step 710 with each of the candidate T1/T2 values. Step 744 reconstructs each of the inverted echo trains with the respective candidate T1/T2 value. Step 746 compares each of the reconstructed echo trains to the original echo train and determines a respective quality measure for each. Step 748 selects one out of the plurality of candidate T1/T2 values based on a comparison of the respective quality measures, e.g., the T1/T2 value that produces the best-fit reconstruction.

Block 770 represents the further processing and uphole transmission of the data that has been compressed using a T1/T2 value. Block 770 comprises a further compression of the data in step 722, scaling of the data, either using a universal factor or a field optimal factor, in step 724, truncating the scaled data in step 776, and transmission of the truncated data in step 778. In certain embodiments, block 770 includes additional processing steps known to those of skill in the art, e.g., conversion of the data to a binary format and/or formatting the data with designators or labels.

In summary, the disclosed systems and methods provide a method of reducing the size of an echo train data set that improves the quality of the reconstructed echo train. The disclosed systems and methods select a T1/T2 value that, when used to invert the original echo train values, produces an improved reconstruction of the data compared to an arbitrary T1/T2 value.

For clarity of explanation, in some instances the present technology may be presented as including individual functional blocks or including functional blocks comprising devices, device components, steps or routines in a method embodied in software, or combinations of hardware and software.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a non-volatile computer-readable memory, or other data storage medium, comprising program code including instructions that, when executed, performs one or more of the method, algorithms, and/or operations described above. The computer-readable data storage medium may form part of a computer program product, which may include packaging materials.

A computer-readable memory, as used herein, includes any type of storage media, e.g., a random access memory (RAM), a synchronous dynamic random access memory (SDRAM), a read-only memory (ROM), a non-volatile random access memory (NVRAM), an electrically erasable programmable read-only memory (EEPROM), a FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The phrase "urging an object" or similar means the application of a force to the object in a manner that will try and move the object toward a defined position or in a specific direction without implying that the object moves or that the object is restricted from moving in another direction, even backward with respect to the direction of the applied force.

Claim language reciting "an item" or similar language indicates and includes one or more than one of the items. For example, claim language reciting "a part" means one part or multiple parts.

Moreover, claim language reciting "at least one of" a set indicates that one member of the set or multiple members of the set satisfy the claim. For example, claim language reciting "at least one of A and B" means A, B, or A and B.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Statements of the disclosure include:
 (A1) A method of compressing nuclear magnetic resonance (NMR) data, comprising steps: (a) acquiring NMR data; (b) acquiring an echo train having a plurality of echo values; (c) selecting a T1/T2 ratio value; (d) inverting a first portion of the echo train using the selected T1/T2 value; (e) reconstructing the inverted echo train using the selected T1/T2 value; (f) determining a quality measure based in part on a comparison of the reconstructed echo train to the original echo train; and (g) inverting and compressing, based on a comparison of the quality measure to a threshold, a second portion of the acquired plurality of echo trains using the selected T1/T2 value.
 (A2) The method of A1, further comprising steps: (h) selecting, if step (g) is not executed, a new T1/T2 value; and (i) repeating, if a new T1/T2 value has been selected, steps (d)-(f) using the new T1/T2 value.
 (A3) The method of A2, wherein: step (h) comprises selecting a new T1/T2 value based in part on the T1//T2 value used in the prior steps (d)-(e).
 (A4) The method of A2, wherein: step (h) comprises selecting a new T1/T2 value based in part on the quality measure.
 (A5) The method of A2, wherein: the T1/T2 value is selected from a predetermined range.
 (A6) The method of A1, wherein: step (c) comprises selecting a plurality of candidate T1/T2 values; step (d) comprises inverting the first portion of the echo train with each of the candidate T1/T2 values; step (e) comprises reconstructing each of the inverted echo trains with the respective candidate T1/T2 values; step (f) comprises determining a respective quality measure for each of the reconstructed echo trains; and step (g) comprises selecting one of the plurality of candidate T1/T2 values based on a comparison of the respective quality measures.
 (B7) A system for compressing nuclear magnetic resonance (NMR) data, comprising: a processor; a memory coupled to the processor and containing instructions that, when loaded into the processor and executed, cause the processor to execute steps: (a) acquiring NMR data; (b) determining an echo train having a plurality of echo values; (c) selecting a T1/T2 ratio value; (d) inverting a first portion of the echo train using the selected T1/T2 value; (e) reconstructing the inverted echo train using the selected T1/T2 value; (f) determining a quality measure based in part on a comparison of the reconstructed echo train to the original echo train; and (g) inverting and compressing, based on a comparison of the quality measure to a threshold, a second portion of the acquired plurality of echo trains using the selected T1/T2 value.
 (B8) The method of B7, wherein the instructions further cause the processor to execute steps: (h) selecting, if step (g) is not executed, a new T1/T2 value; and (i) repeating, if a new T1/T2 value has been selected, steps (d)-(f) using the new T1/T2 value.
 (B9) The method of B8, wherein: step (h) comprises selecting a new T1/T2 value based in part on the T1//T2 value used in the prior steps (d)-(e).
 (B10) The method of B8, wherein: step (h) comprises selecting a new T1/T2 value based in part on the quality measure.
 (B11) The method of B8, wherein: the T1/T2 value is selected from a predetermined range.
 (B12) The method of B7, wherein: step (c) comprises selecting a plurality of candidate T1/T2 values; step (d) comprises inverting the first portion of the echo train with each of the candidate T1/T2 values; step (e)

comprises reconstructing each of the inverted echo trains with the respective candidate T1/T2 values; step (f) comprises determining a respective quality measure for each of the reconstructed echo trains; and step (g) comprises selecting one of the plurality of candidate T1/T2 values based on a comparison of the respective quality measures.

(C13) A memory containing instructions for compressing nuclear magnetic resonance (NMR) data that, when loaded into a processor and executed, cause the processor to execute steps: (a) acquiring NMR data; (b) determining an echo train having a plurality of echo values; (c) selecting a T1/T2 ratio value; (d) inverting a first portion of the echo train using the selected T1/T2 value; (e) reconstructing the inverted echo train using the selected T1/T2 value; (f) determining a quality measure based in part on a comparison of the reconstructed echo train to the original echo train; and (g) inverting and compressing, based on a comparison of the quality measure to a threshold, a second portion of the acquired plurality of echo trains using the selected T1/T2 value.

(C14) The method of C13, wherein the instructions further cause the processor to execute steps: (h) selecting, if step (g) is not executed, a new T1/T2 value; and (i) repeating, if a new T1/T2 value has been selected, steps (d)-(f) using the new T1/T2 value.

(C15) The method of C14, wherein: step (h) comprises selecting a new T1/T2 value based in part on the T1//T2 value used in the prior steps (d)-(e).

(C16) The method of C14, wherein: step (h) comprises selecting a new T1/T2 value based in part on the quality measure.

(C17) The method of C14, wherein: the T1/T2 value is selected from a predetermined range.

(C18) The method of C13, wherein: step (c) comprises selecting a plurality of candidate T1/T2 values; step (d) comprises inverting the first portion of the echo train with each of the candidate T1/T2 values; step (e) comprises reconstructing each of the inverted echo trains with the respective candidate T1/T2 values; step (f) comprises determining a respective quality measure for each of the reconstructed echo trains; and step (g) comprises selecting one of the plurality of candidate T1/T2 values based on a comparison of the respective quality measures.

What is claimed is:

1. A method of compressing nuclear magnetic resonance (NMR) data, comprising steps:
   (a) acquiring NMR data;
   (b) acquiring an echo train having a plurality of echo values;
   (c) selecting a T1/T2 ratio value;
   (d) inverting a first portion of the echo train using the selected T1/T2 value;
   (e) reconstructing the inverted echo train using the selected T1/T2 value;
   (f) determining a quality measure based in part on a comparison of the reconstructed echo train to the original echo train; and
   (g) inverting and compressing, based on a comparison of the quality measure to a threshold, a second portion of the acquired plurality of echo trains using the selected T1/T2 value.

2. The method of claim 1, further comprising steps:
   (h) selecting, if step (g) is not executed, a new T1/T2 value; and
   (i) repeating, if a new T1/T2 value has been selected, steps (d)-(f) using the new T1/T2 value.

3. The method of claim 2, wherein:
   step (h) comprises selecting a new T1/T2 value based in part on the T1/T2 value used in prior steps (d)-(e).

4. The method of claim 2, wherein:
   step (h) comprises selecting a new T1/T2 value based in part on the quality measure.

5. The method of claim 2, wherein:
   the T1/T2 value is selected from a predetermined range.

6. The method of claim 1, wherein:
   step (c) comprises selecting a plurality of candidate T1/T2 values;
   step (d) comprises inverting the first portion of the echo train with each of the candidate T1/T2 values;
   step (e) comprises reconstructing each of the inverted echo trains with the respective candidate T1/T2 values;
   step (f) comprises determining a respective quality measure for each of the reconstructed echo trains; and
   step (g) comprises selecting one of the plurality of candidate T1/T2 values based on a comparison of the respective quality measures.

7. A system for compressing nuclear magnetic resonance (NMR) data, comprising:
   a processor; and
   a memory coupled to the processor and containing instructions that, when loaded into the processor and executed, cause the processor to execute steps:
   (a) acquiring NMR data;
   (b) determining an echo train having a plurality of echo values;
   (c) selecting a T1/T2 ratio value;
   (d) inverting a first portion of the echo train using the selected T1/T2 value;
   (e) reconstructing the inverted echo train using the selected T1/T2 value;
   (f) determining a quality measure based in part on a comparison of the reconstructed echo train to the original echo train; and
   (g) inverting and compressing, based on a comparison of the quality measure to a threshold, a second portion of the acquired plurality of echo trains using the selected T1/T2 value.

8. The system of claim 7, wherein the instructions further cause the processor to execute steps:
   (h) selecting, if step (g) is not executed, a new T1/T2 value; and
   (i) repeating, if a new T1/T2 value has been selected, steps (d)-(f) using the new T1/T2 value.

9. The system of claim 8, wherein:
   step (h) comprises selecting a new T1/T2 value based in part on the T1/T2 value used in prior steps (d)-(e).

10. The system of claim 8, wherein:
    step (h) comprises selecting a new T1/T2 value based in part on the quality measure.

11. The system of claim 8, wherein:
    the T1/T2 value is selected from a predetermined range.

12. The system of claim 7, wherein:
    step (c) comprises selecting a plurality of candidate T1/T2 values;
    step (d) comprises inverting the first portion of the echo train with each of the candidate T1/T2 values;
    step (e) comprises reconstructing each of the inverted echo trains with the respective candidate T1/T2 values;
    step (f) comprises determining a respective quality measure for each of the reconstructed echo trains; and step (g) comprises selecting one of the plurality of candidate T1/T2 values based on a comparison of the respective quality measures.

13. A non-transitory computer-readable medium comprising computer-executable instructions for compressing nuclear magnetic resonance (NMR) data, the instructions effective to cause one or more processors to execute steps:
- (a) acquiring NMR data;
- (b) determining an echo train having a plurality of echo values;
- (c) selecting a T1/T2 ratio value;
- (d) inverting a first portion of the echo train using the selected T1/T2 value;
- (e) reconstructing the inverted echo train using the selected T1/T2 value;
- (f) determining a quality measure based in part on a comparison of the reconstructed echo train to the original echo train; and
- (g) inverting and compressing, based on a comparison of the quality measure to a threshold, a second portion of the acquired plurality of echo trains using the selected T1/T2 value.

14. The non-transitory computer-readable medium of claim 13, wherein the instructions further cause the one or more processors to execute steps:
- (h) selecting, if step (g) is not executed, a new T1/T2 value; and
- (i) repeating, if a new T1/T2 value has been selected, steps (d)-(f) using the new T1/T2 value.

15. The non-transitory computer-readable medium of claim 14, wherein:
step (h) comprises selecting a new T1/T2 value based in part on the T1/T2 value used in prior steps (d)-(e).

16. The non-transitory computer-readable medium of claim 14, wherein:
step (h) comprises selecting a new T1/T2 value based in part on the quality measure.

17. The non-transitory computer-readable medium of claim 14, wherein:
the T1/T2 value is selected from a predetermined range.

18. The non-transitory computer-readable medium of claim 13, wherein:
step (c) comprises selecting a plurality of candidate T1/T2 values;
step (d) comprises inverting the first portion of the echo train with each of the candidate T1/T2 values;
step (e) comprises reconstructing each of the inverted echo trains with the respective candidate T1/T2 values;
step (f) comprises determining a respective quality measure for each of the reconstructed echo trains; and
step (g) comprises selecting one of the plurality of candidate T1/T2 values based on a comparison of the respective quality measures.

* * * * *